United States Patent [19]
Ovnicek

[11] Patent Number: 5,439,062
[45] Date of Patent: Aug. 8, 1995

[54] HORSESHOE FOR TREATMENT OF LAME HORSES

[76] Inventor: Eugene D. Ovnicek, 286 Wishart Rd., Columbia Falls, Mont. 59912

[21] Appl. No.: 138,952

[22] Filed: Oct. 18, 1993

Related U.S. Application Data

[63] Continuation-in-part of Ser. No. 947,140, Sep. 18, 1992, Pat. No. 5,253,715.

[51] Int. Cl.⁶ .............................. A01L 1/00; A01L 7/02
[52] U.S. Cl. ................................................ 168/14; 168/32
[58] Field of Search .................... 168/14, 26, 28, 31, 168/32, 33

[56] References Cited

U.S. PATENT DOCUMENTS

| | | | |
|---|---|---|---|
| 685,769 | 11/1901 | Kent | 168/28 |
| 1,140,851 | 5/1915 | Robins | 168/33 |
| 1,212,601 | 1/1917 | Anthony | 168/31 |
| 3,907,036 | 9/1975 | Capone | 168/28 X |

*Primary Examiner*—Robert P. Swiatek
*Attorney, Agent, or Firm*—Harry M. Cross, Jr.

[57] ABSTRACT

A combination hoof pad and horseshoe which raises the horse's heel and at the same time supports the coffin bone. The pad is wedge-shaped to be higher at the heel and lower at the toe. An insert support is located on the bottom of the pad such that it presses upwardly from the ground line to give support to the center of the coffin bone. The shoe portion of the remedial pad and shoe combination is provided with replaceable high heels thus raising the hoof heel to relax the flexor tendons. Relaxing the flexor tendons reduces pull on the coffin bone.

41 Claims, 10 Drawing Sheets

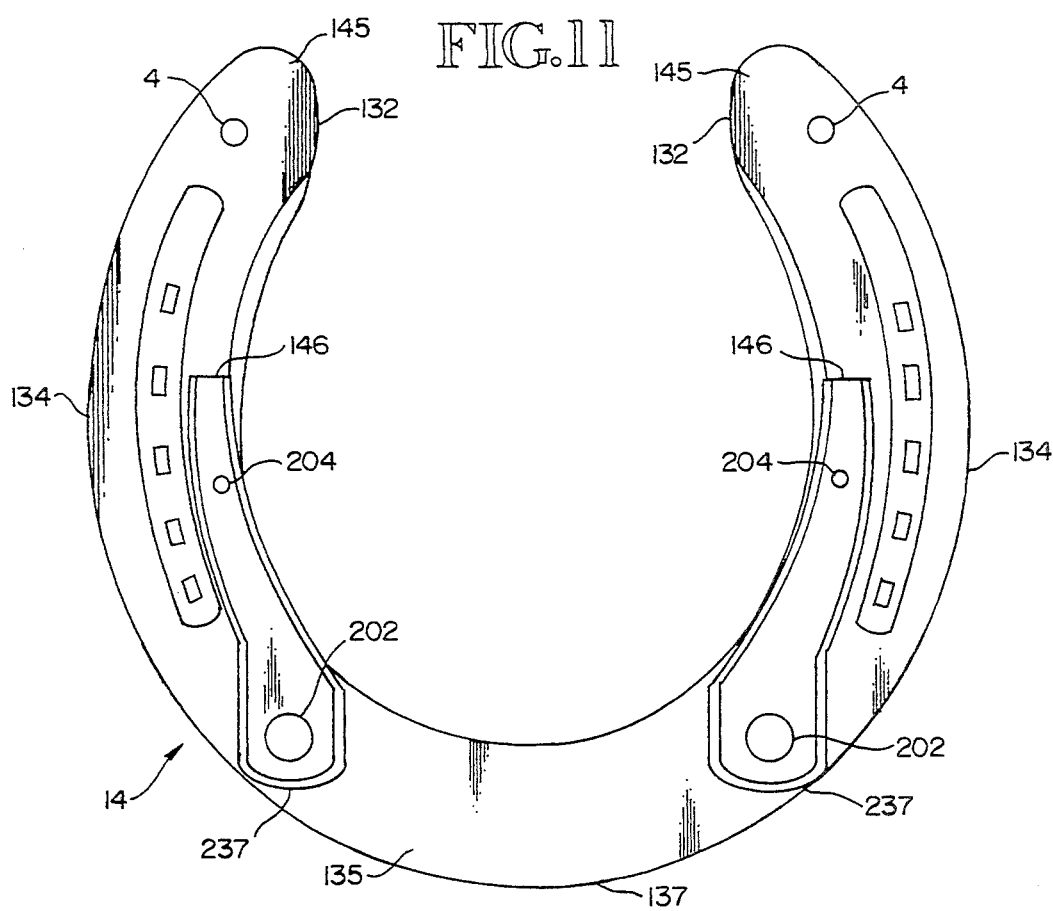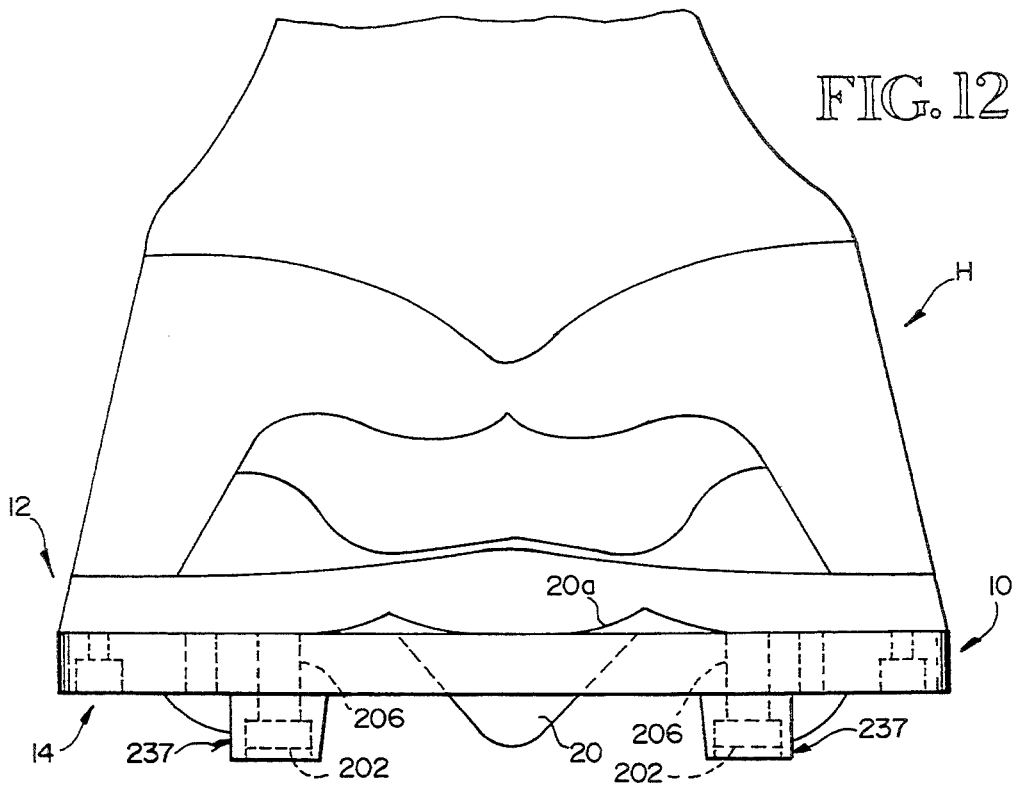

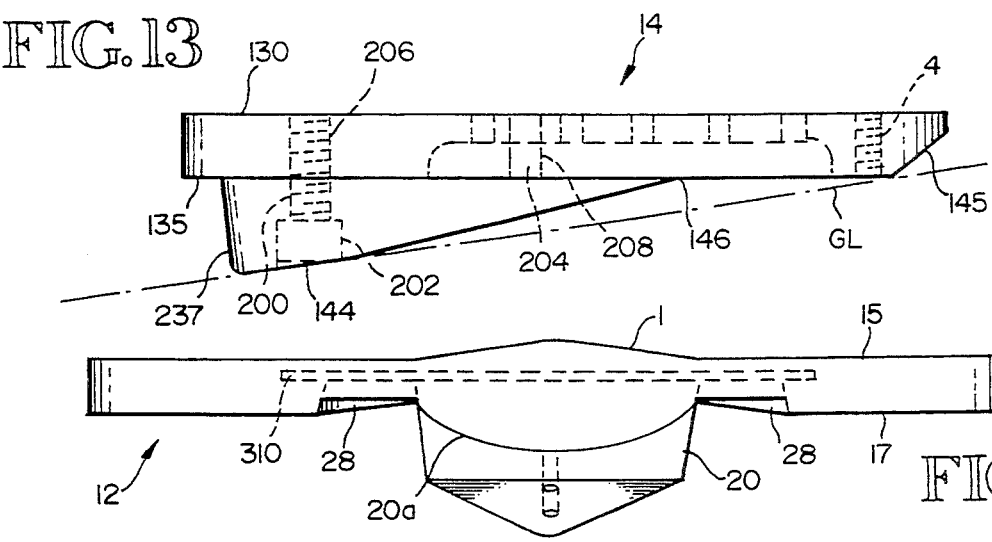
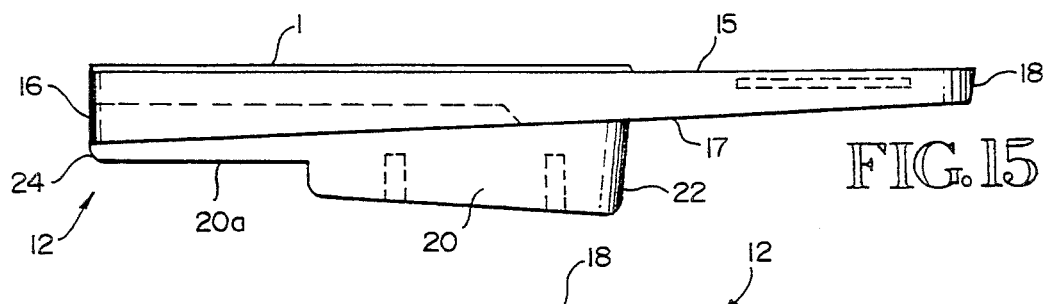
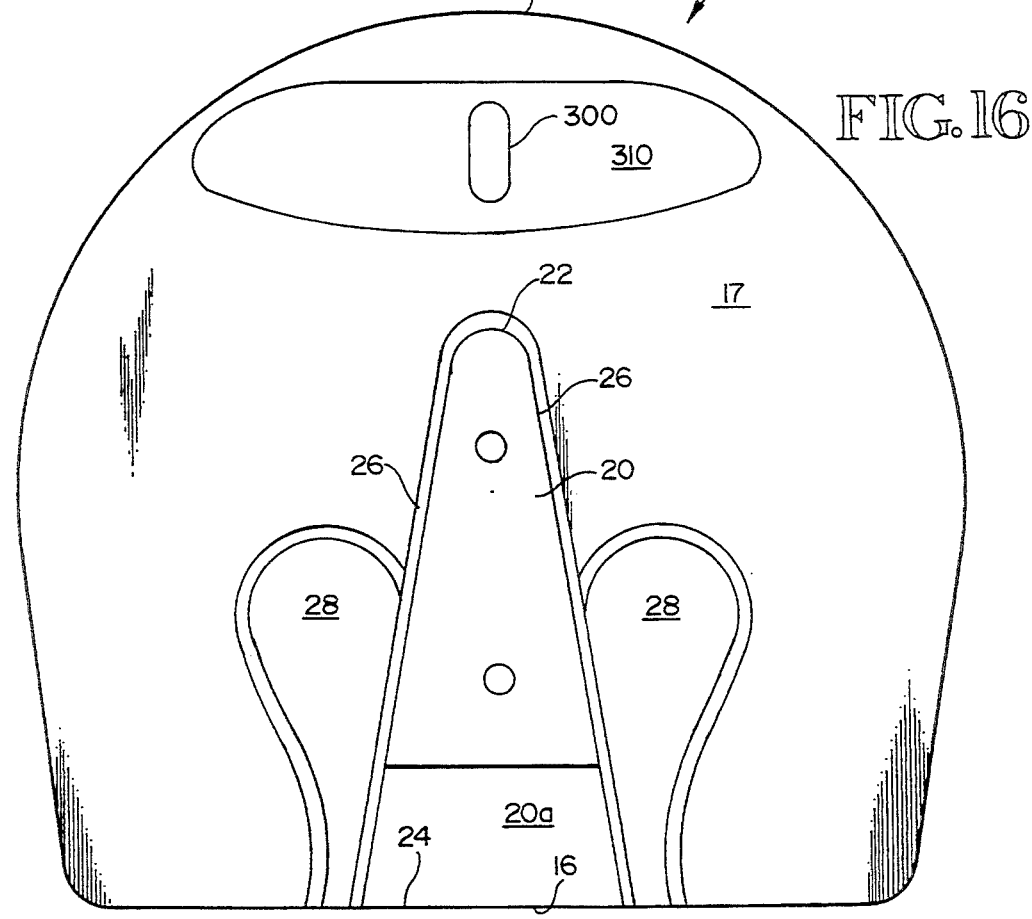

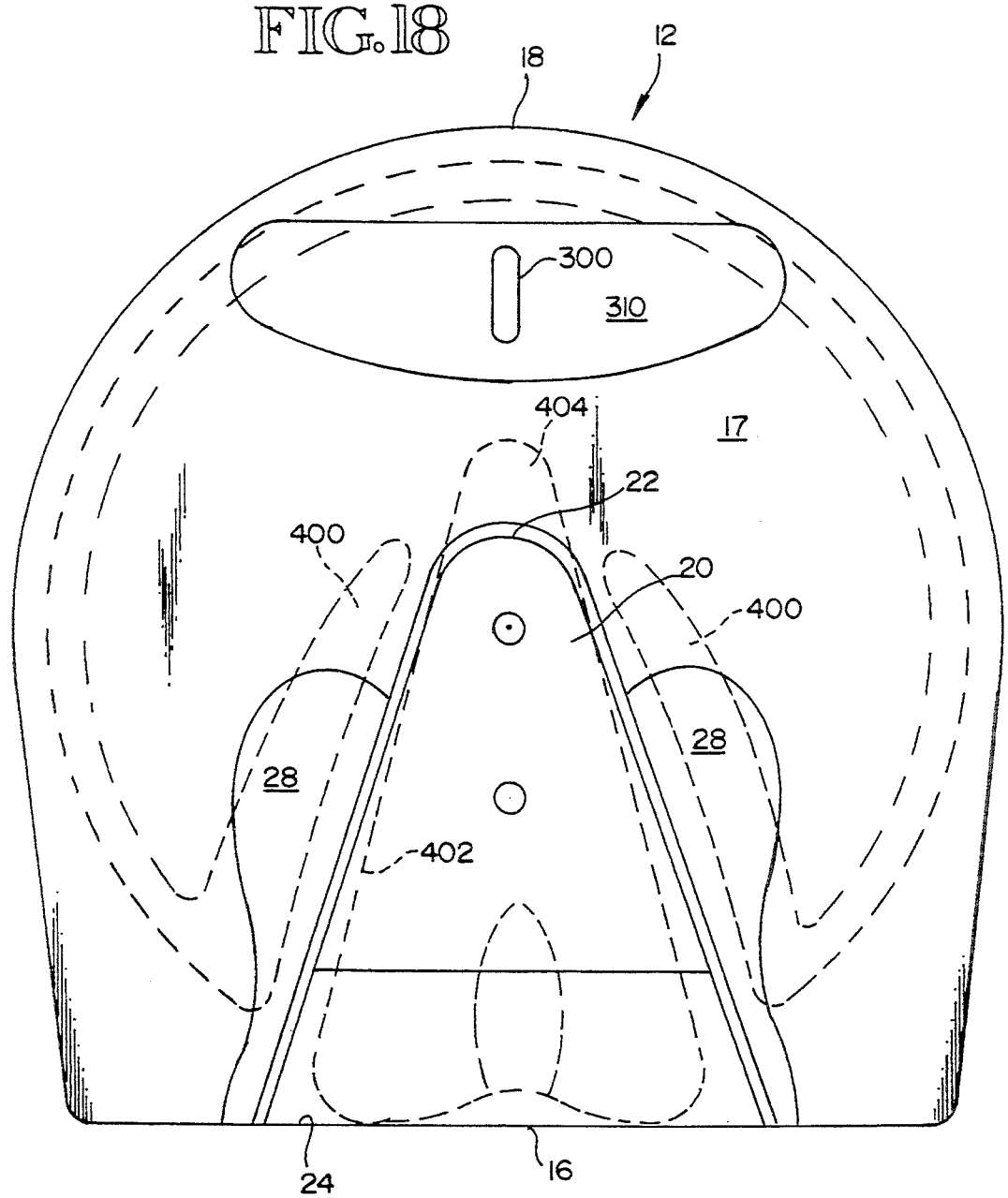

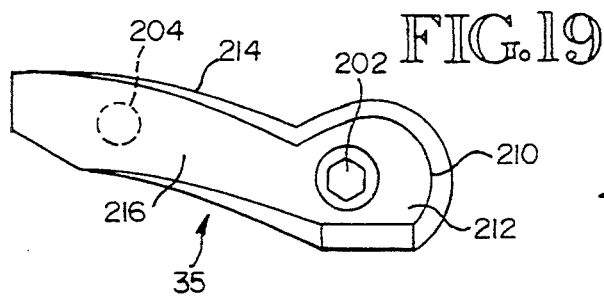
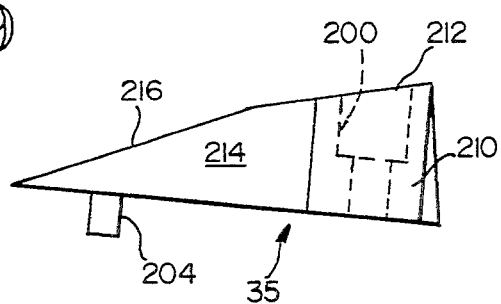
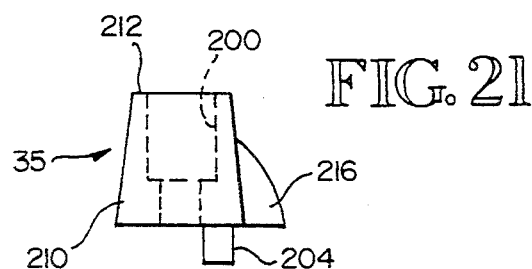
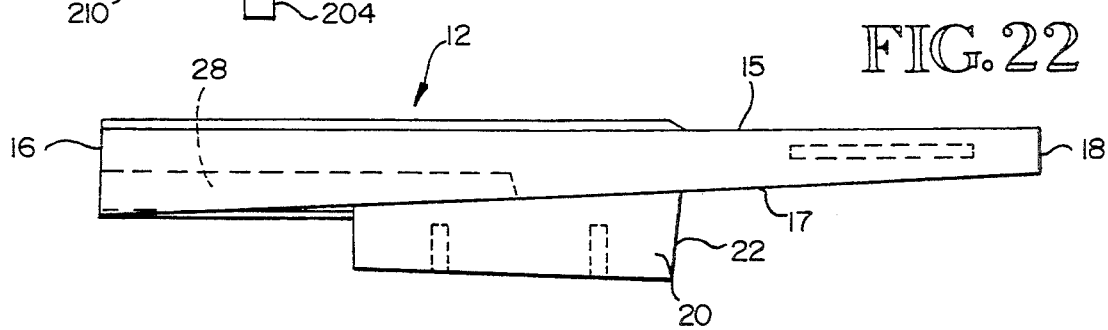
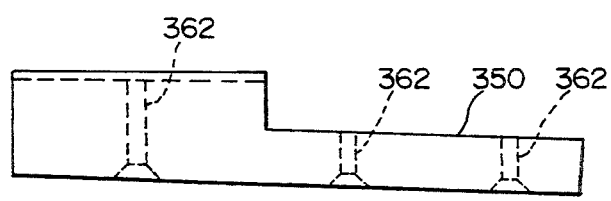
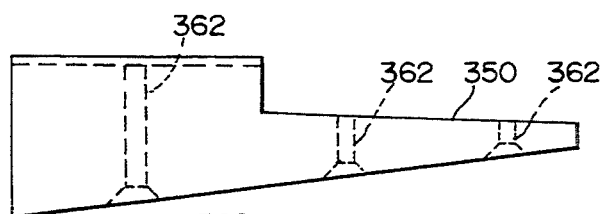
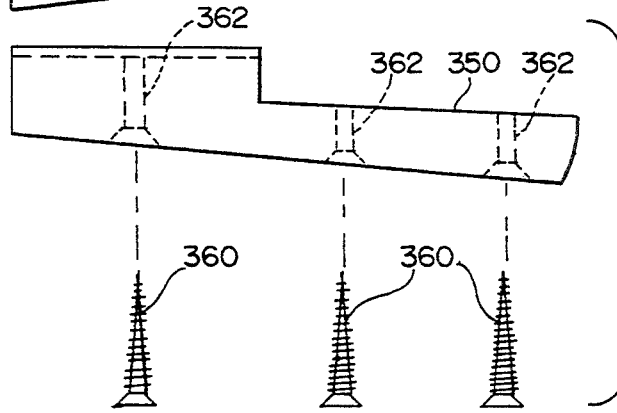

HORSESHOE FOR TREATMENT OF LAME HORSES

RELATED APPLICATION

This application is a continuation-in-part of application Ser. No. 07/947,140, filed Sep. 18, 1992.

This application is now U.S. Pat. No. 5,253,715, issued Oct. 19, 1993.

FIELD OF THE INVENTION

The invention relates generally to the field of farriery and more particularly to a horse shoe design for horse's hooves which is to be used in the treatment of founder and laminitis and other hoof and lower leg ailments in horses.

BACKGROUND OF THE INVENTION

Veterinarians and farriers are well acquainted with the varieties of lameness problems in horses. Two particularly vexing ailments of the hoof and lower leg are founder and laminitis, conditions which involve partial or complete separation of the coffin bone and inner hoof wall.

Treatment of laminitis and founder requires that several aspects of the problem be considered. One is that the fever created by the founder and the accompanying trauma causes the coffin bone and the hoof wall to disconnect or separate one from the other in whole or in part. A second condition is that the inflammation results in contraction of the flexor tendons which in turn tends to pull the coffin bone away from the inner face of the hoof wall. Thirdly, the downward pressure resulting from the horse's own weight causes rotation or displacement of the coffin bone. This bone displacement is aggravated by pressure applied to the toe of the hoof.

Hoof pads and various types of shoes have been designed to alleviate pain to the animal caused by founder and laminitis and to assist in the treatment process. So far as in known, however, no devices for hoof wear have been designed that have proven to be effective other than the hoof pad and shoe combination described in the above-identified application of which this is a continuation-in-part.

SUMMARY OF THE INVENTION

The invention comprises a hoof pad designed to support the center of a horse's foot and further comprises the combination of the hoof pad and horseshoe which raises the horse's heel and at the same time supports the frog and the bars and, hence, the coffin bone. The pad is preferably wedge-shaped to be higher at the heel and lower at the toe. An insert frog support is located on the bottom of the pad such that it presses upwardly from the ground line to give support to the center of the foot, including the frog and the bars and the coffin bone. The shoe portion of the remedial hoof pad and shoe combination is provided with elevated heels thus raising the hoof heel to relax the flexor tendon. Relaxing the flexor tendon reduces pull on the coffin bone.

The present remedial horseshoe and pad combination is specifically directed to laminitis (founder) conditions. The present invention provides a rim shoe that carries elevated heels, and a full pad that carries a longitudinally-placed elongated frog insert wedge. The elevated heels have a height and length sufficient to support the hoof with the horse's heel elevated to release tension on the horse's flexor tendon. As such, the elevated heels must have enough length to support the hoof with the heel elevated; a typical "heel caulk" or "heel grab" that is intended to provide traction would not be preferred inasmuch as such would dig into soft terrain and not support the hoof with the heel elevated. The frog insert wedge extends from the rear edge of the shoe pad to about the center of the pad. It is constructed and arranged with respect to the elevated heels such that the front tip of the frog insert protrudes down below the shoe ground contact line. Also, the frog insert is elongated so that it generally underlies the length of the frog. Consequent of this structure, when a horse stands on a hoof shod with this combination, the elevated heels will elevate the rear of the foot and the front tip of the frog insert will be pressed up against the frog to compress it upward and thereby support the coffin bone. Moreover, when the horse picks the shod foot up, ground pressure against the frog insert will be removed and the pressure, exerted by the frog insert, against the frog and the bars of the foot will be released so that the frog and the adjacent sole areas will relax thereby aiding normal blood circulation through the foot. In order for this combination to be effective, both the elevated heels and the frog insert must be elongated. Merely supporting the frog adjacent to the heel region of the foot would not be adequate because the elevated heels remove that part of the foot from ground contact; and a "short" frog insert would not extend far enough forward toward the center of the shod foot so that the insert would be exposed and protrude down below the ground contact line so that it could press the shoe pad up against the frog.

Accordingly, it is among the features of the invention to provide a remedial shoe that is designed specifically to allow a horse to move even though its hoof is afflicted with laminitis or founder. The shoe is uniquely simple but effective and long lasting. Replaceable heels are provided to elevate the heel end of the shoe to relieve the flexor tendon from the kind of tension which exerts pull on the coffin bone to separate it from the hoof wall. Nails for the shoe can be placed more to the rear or posterior of the foot and thus further from the traumatized area.

It is furthermore among the features of the invention to provide a remedial full hoof pad that is designed specifically to fully support the center of the frog and the bars of the foot for full support of a lame foot by a rim shoe. The pad offers support for a coffin bone that is wholly or partially separated from the inner surface of the hoof wall. The pad in providing center hoof support for the coffin bone also stimulates the blood supply to the hoof area. This hoof pad has efficacy when use with a plain shoe in the latter stages of treating founder laminitis, for example.

BRIEF DESCRIPTION OF THE DRAWINGS

FIG. 11 is a top plan view of an open toe—closed heel embodiment of the combination shoe and pad;

FIG. 12 is a rear elevation view of the combination shoe and pad of FIG. 11 as mounted to a horse's hoof;

FIG. 13 is a side elevation of the shoe of FIG. 11;

FIG. 14 is a rear end view of the hoof pad of FIG. 11;

FIG. 15 is a side elevation view of the FIG. 14 pad;

FIG. 16 is a bottom plan view of the hoof pad of FIG. 14;

FIG. 18 is a bottom plan view of a hoof pad according to the invention, with the bottom of a horse's hoof indicated in dotted line, showing the relationship of the hoof's bottom structure to the features of the hoof pad;

FIGS. 19–21 are bottom, side and rear end views, respectively, if a suitable, replaceable heel member that may be used with either shoe embodiment;

FIG. 22 is a side elevation view of the FIG. 16 hoof pad;

FIGS. 23–25 are three frog insert additions that may be selectively added to the underside of the FIG. 22 hoof pad;

DETAILED DESCRIPTION OF THE INVENTION

Figure 1:
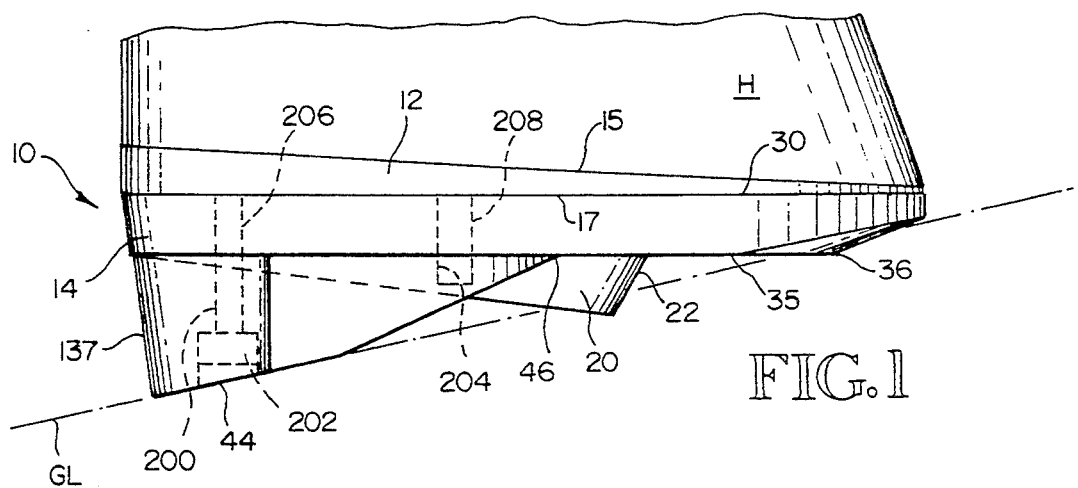
FIG. 1 is a side elevation view of a closed toe—open heel embodiment of the combination shoe and pad as mounted to a horse's hoof.

The hoof pad and shoe combination of this invention are specifically designed for pathology of the equine hoof and leg; specifically those afflicted with a displaced coffin bone as a result of founder laminitis. The use of this combination is not restricted to this pathology since navicular disease, tendon strains, coffin bone fractures, thrush, quarter cracks, and the like have been helped with this hoof pad and shoe combination, or with the hoof pad or the shoe alone.

In cases of laminitis, several things happen. The blood supply to the foot is interrupted for various reasons. The attaching tissue that holds the coffin bone in place within the hoof capsule is affected. Not only the lamina on the dorsal surface of the coffin bone but the surface on the bottom of the coffin bone can be involved. This can involve a very wide range of pathology. This is the reason for the specialized variety of adjustments available with the invention.

Referring now to the drawings it will be seen that the combination hoof pad and horseshoe, generally designated by the number 10, includes pad 12 and shoe 14.

The wedge-shaped pad 12 is thickest at its rear or heel end 16 and narrower at its toe end 18 and the overall shape may be configured to the outside edges of shoe 14 which in turn is shaped to the outside edges of the hoof H. The rear end 16 of pad 12 is, for purposes of illustration, approximately 9/16 inches thick and the front end is approximately 3/32 inches thick at the toe edge. Pad 12 has upper face 15 which contacts the bottom of hoof H and a bottom face 17 on the under side. It can be made of a tough rubber or plastic material which possesses some flexing capability.

Figure 6:
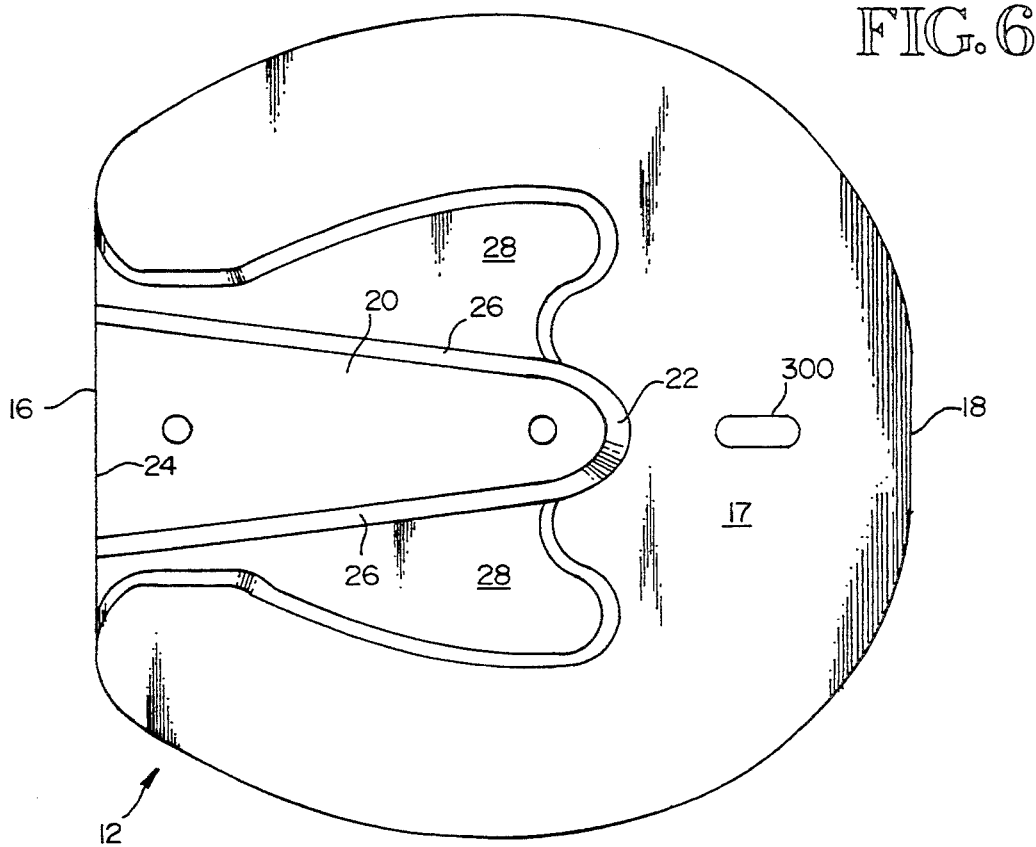
FIG. 6 is a bottom plan view of the hoof pad of FIG. 1.
Figure 7:
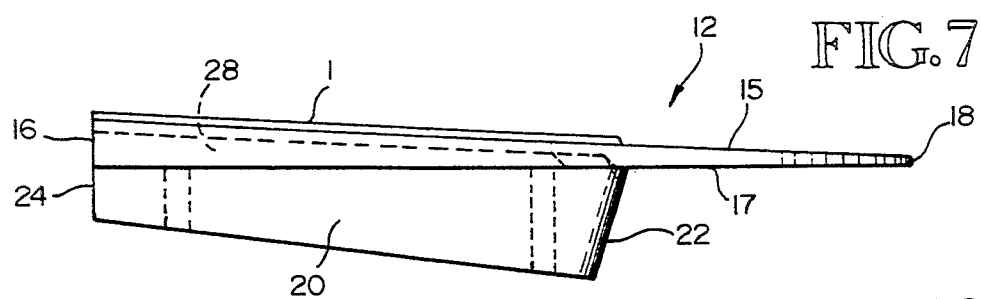
FIG. 7 is a side elevation of the FIG. 6 pad.

Integrally-formed with or securely attached to wedge shaped pad 12 is a wedge shaped frog insert 20 on the ground face of the pad and having inner tip end 22 and rear edge 24. It will be noted from the drawings that the frog insert is shaped like a narrow triangle such that it has nearly straight side edges 26 extending back from front end 22 to rear edge 24, and the inner tip end is rounded. It will be observed from FIG. 2 that frog insert 20 is also wedge shaped, being thinner at its rear edge 24 than at its tip edge 22. Reference is made here to FIGS. 6–9, particularly. In the illustrative drawings, frog insert 20 is approximately 7/16 inches thick at rear edge 24 and about 11/16 inches thick at its inner end 22. Thus, a ground contact surface 25 is defined on frog insert 20 with the inner end 22 being located at a predetermined point under hoof H. Two irregularly shaped partial cut out areas 28 may be located on each side of frog insert 20 as is best seen in FIGS. 6 and 7 for reasons to be explained hereinafter. The edges of these cutouts 28 are sloped outward to facilitate dirt removal from the cutout areas. Cutouts 28 are not voids but are formed to about half the thickness of pad 12 to lend flexibility to the frog insert 20. Pad 12 may have a taper of 2° to 8°.

Figure 8:
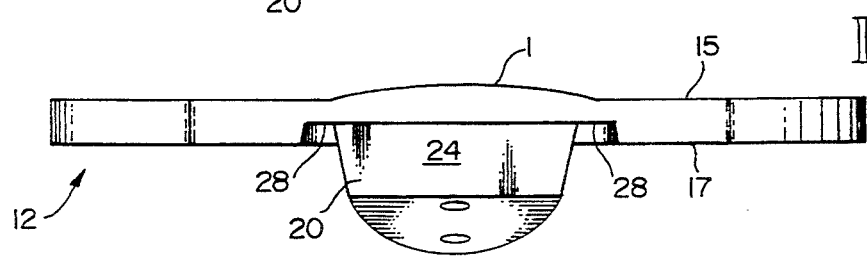
FIG. 8 is a rear elevation view of the pad of FIG. 6.

Pad 12 preferably has a central, longitudinal raised portion 1 on its upper surface that generally overlies the frog insert 20 as shown in FIGS. 7, 8, 10 and 14, 15, 17. This raised portion 1 has its highest point along its longitudinal center and it may have a rounded upper surface as shown in FIG. 8 or a beveled surface as shown in FIG. 14. This raised portion 1 helps support the frog directly.

Shoe 14 is a full rim device having a planar upper surface a and bottom surface. Shoe 14 may have a closed toe—open heel configuration as shown in FIGS. 1–5 or it may have an open toe—closed heel configuration as shown in FIGS. 11–13. The shoe body 14 is about ⅜ inch thick but may be thinner or thicker as desired and formed of fiberglass, plastic, or of metal such as aluminum or steel.

Figure 2:
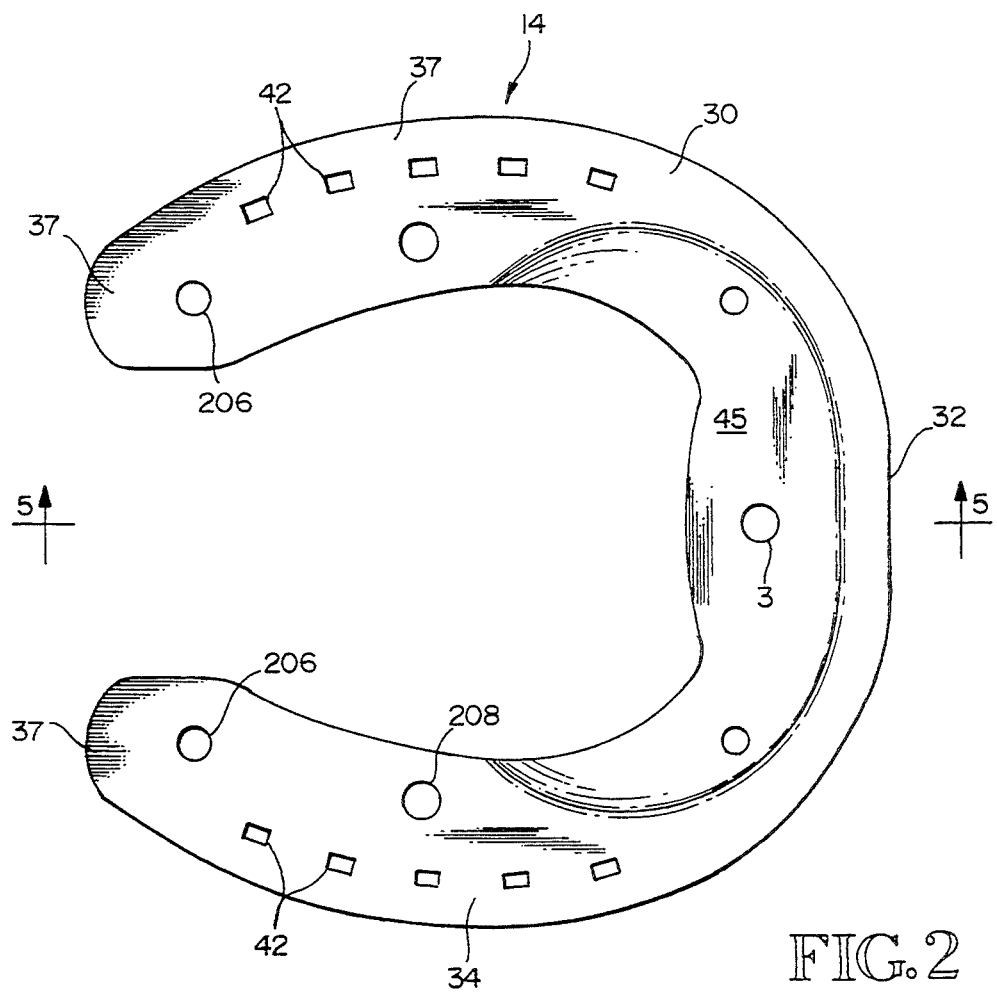
FIG. 2 is a top plan view of the FIG. 1 shoe.
Figure 3:
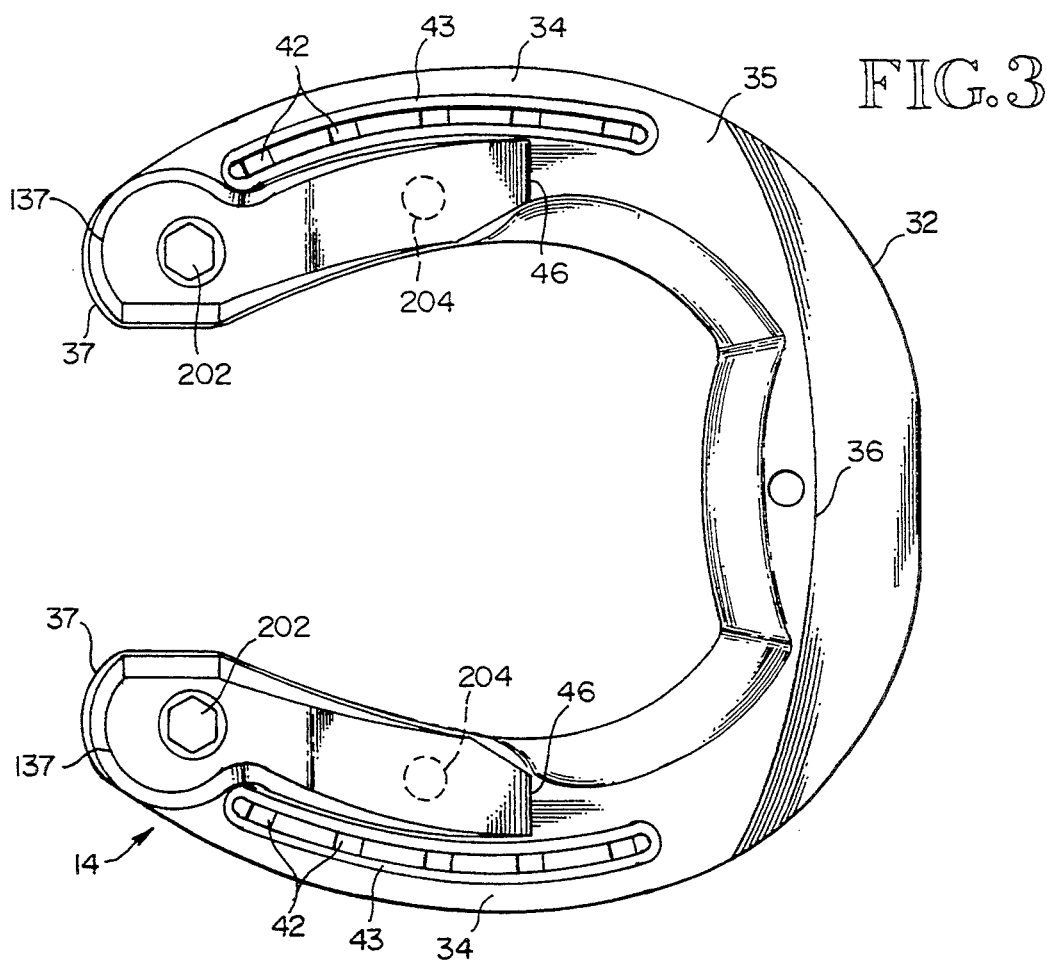
FIG. 3 is a bottom plan view of the FIG. 1 shoe.
Figure 4:
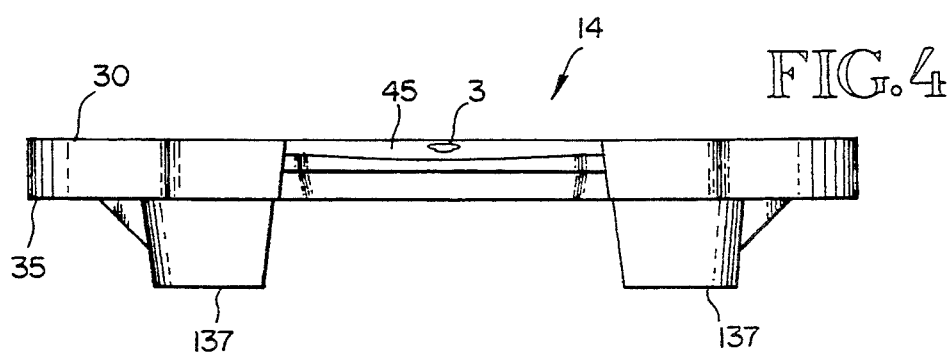
FIG. 4 is a rear end view of the FIG. 1 shoe.
Figure 5:
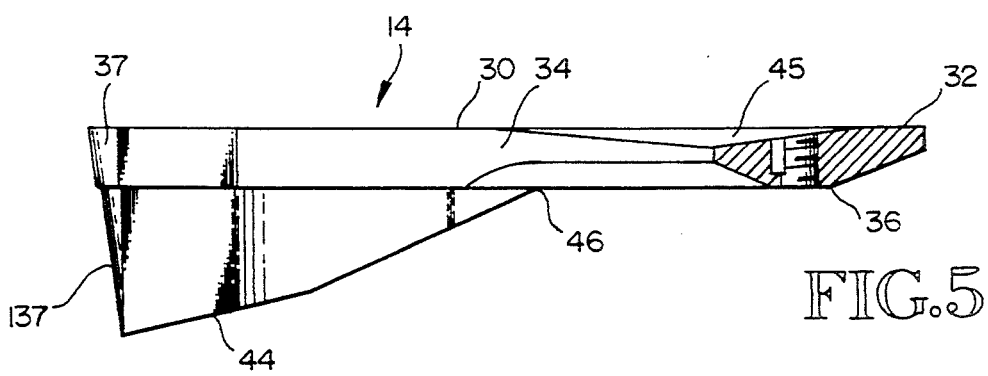
FIG. 5 is a side elevation view of the FIG. 1 shoe taken along the lines 5—5 of FIG. 2.

Shoe 14, as seen is FIGS. 1–5 has planar upper surface 30 and bottom surface 35, a rounded toe portion 32, branch portions 34 and heel portions 37. At the toe the shoe bevels approximately from line 36 to a thickness of about ⅛ inch or less. Also, the toe area contains a concave section 45 on the upper surface with the toe area crowned downwardly on the bottom surface. It will be noted that the toe of body 14 widens at the rear edge to define a rear toe edge 40 such that concave section 45 is actually wider than the remainder of the shoe body sections. Nail holes 42 for the shoe are located generally as shown in FIGS. 1 and 2 within fullering grooves 43. Each heel portion 37 of the shoe portion 14 is provided with a replaceable elevated heel member 137 located preferably inside the nail line, such that a ground contact surface 44 is formed extending to a forward point 46 at about mid-shoe. It will be seen that the rear portion of ground contact surface 44 is generally parallel to the ground contact line GL of the shoe for a distance of ¾ to 1 inch. Ground contact surface 44 then begins to angle upwardly toward forward point 46. This shoe configuration has a structure that is uniform in width, preferably between about ¾–1 inch wide, and 5/16–1/2 inch thick. The heel portions are slightly removed on the inner side of the branch at the most rearward ends as shown in FIG. 2. This shoe is quite broad at the toe portion to enable the shoe to be placed more to the rear and still allow the nail holes to fall in proper placement position. The outer leading edge of the shoe at the toe end is beveled to create a roll for ease of breakover. This bevel involves the complete front area of the shoe to its widest point. This shoe is provided with a threaded pad attachment hole 3 along the centerline of the shoe in the middle of the dished-out upper surface 45 so that the toe end of the pad may be screwed to the shoe toe and so that the surrounding portion of the pad may be recessed into the recessed area 45.

Shoe 14, as seen in FIGS. 11-13 has planar upper surface 130 and bottom surface 135, an open toe portion 132, branch portions 134 and a closed heel having heel portions 337. At the toe the shoe bevels approximately from lines 136 to a thickness of about ⅛ inch or less. Nail holes 142 for the shoe are located generally as shown in FIGS. 11 and 13 within fullering grooves 143. Each heel portion of the shoe 14 is provided with a replaceable elevated heel member 237 located preferably inside the nail line, such that a ground contact surface 144 is formed extending to a forward point 146 at about mid-shoe. It will be seen that the rear portion of ground contact surface 144 is generally parallel to the ground contact line GL of the shoe for a distance of ¾ to 1 inch. Ground contact surface 144 then begins to angle upwardly toward forward point 146. This shoe configuration has a structure that is uniform in width, preferably between about ¾-1 inch wide, and 5/16-1/2 inch thick. At the open toe, the structure narrows slightly on the inner side of the branch at the most forward ends as seen in FIG. 11. The end surfaces 145 of the toes are beveled upward and forward to provide easy breakover.

The heel members 137, 237 are replaceable. Consequently, the degree of heel elevation of the shoe may be varied by selecting heel members having the desired height. These heel members may vary in height from essentially nothing up to about 1 inch. The heel members 137 suitable for use with the closed toe shoe embodiment of FIGS. 1-5 may be interchangeable with the heel members 237 for use with the closed heel shoe embodiment of FIGS. 11-13. The heel members are provided in pairs with a left and right heel member in each set. The heel members 137 shown in FIGS. 1-5 have a higher elevation than the heel members 237 shown in FIGS. 11-13, illustrating that the heel elevation of a shoe fitted out in accordance with the invention may be changed, as treatment needs require. Each heel member 137 or 237, is provided with a rearward bolt hole 200 for receiving an attachment bolt 202, and with a forward alignment pin 204 that protrudes upward from the upper surface of the heel member. A corresponding threaded bolt hole 206 and a corresponding pin hole 208 are provided in the bottom surface of the shoe 14. Bolt 202 secures the heel member to the underside of the shoe 14 and pin 204 aligns and stabilizes the heel member. Each heel member, as particularly shown in FIGS. 19-21, comprises an enlarged rear end 210 that contains bolt hole 200 and provides a main ground-bearing surface 212, and a forward-reaching arm 214 that has an arcuate configuration to fit alongside the shoe fullering grooves and provides an declining secondary ground-bearing surface 216.

Figure 10:
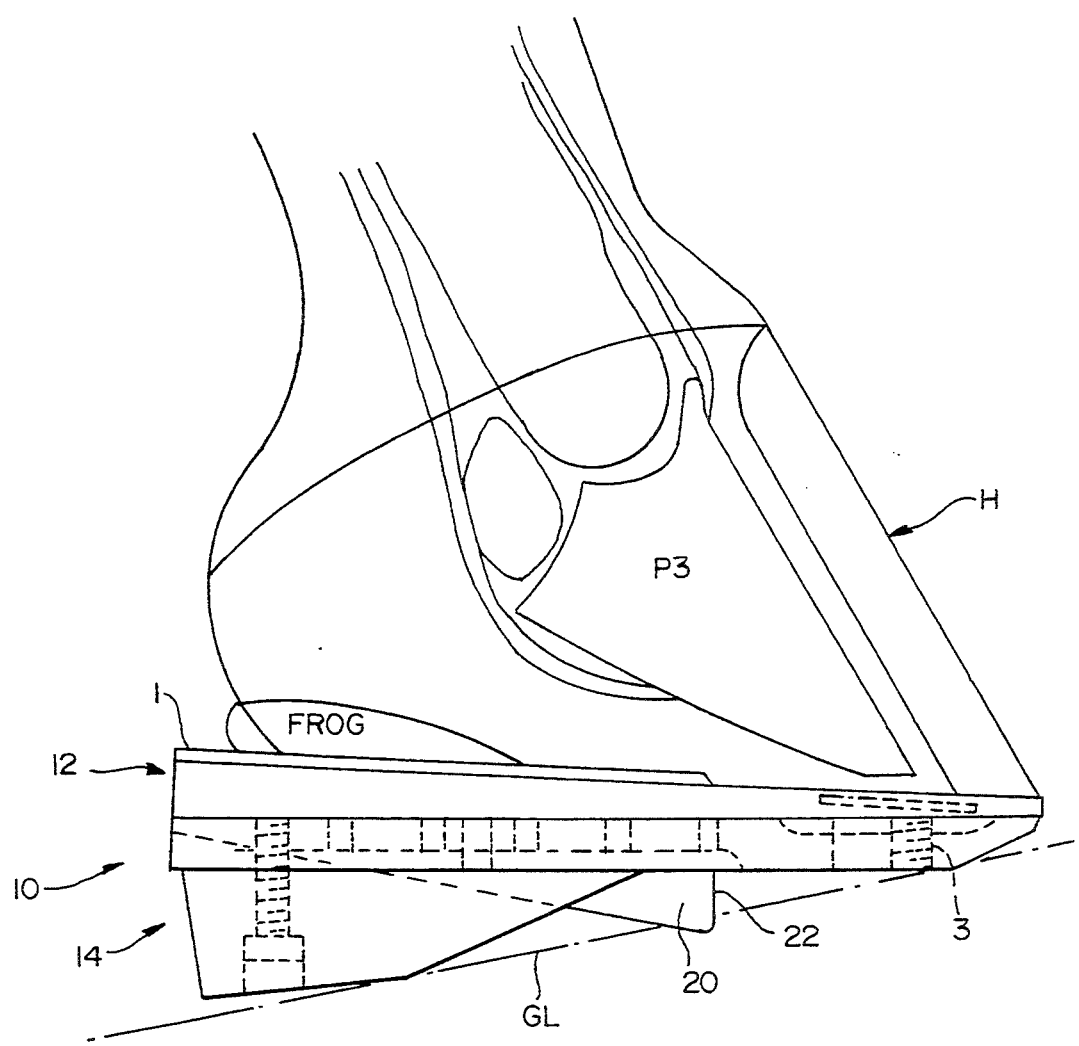
FIG. 10 is a side elevation view of the FIG. 1 hoof pad and shoe as mounted on a horse's foot showing the relationship of the coffin bone (P3) and the frog to the frog insert.
Figure 17:
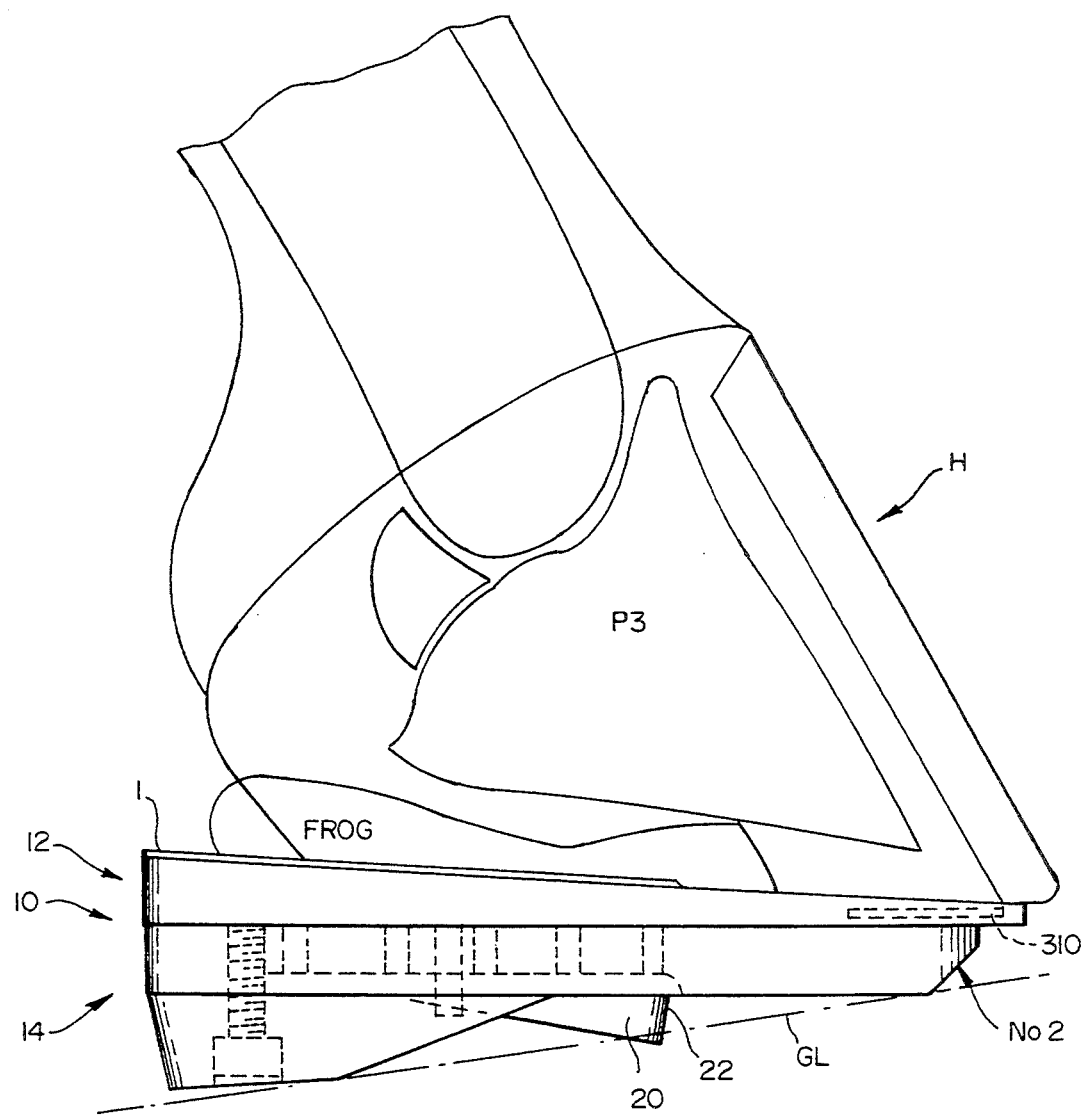
FIG. 17 is a side elevation view of the FIG. 11 hoof pad and shoe as mounted on a horse's foot showing the relationship of the coffin bone (P3) and the frog to the frog insert.

Reference to FIGS. 1, 10 and 17 shows that the forward part of frog insert 20 extends outwardly beyond what would be a straight ground contact line GL when the hoof is in full contact with the ground. It is contemplated that dimensions of the combination of pad and shoe may be varied depending on the treatment needs of a particular horse. Thus, as is shown in the drawings, the forward portion of frog insert 20 when viewed from the side will extend about ¼ inch past the ground line GL. However, the distance by which the frog insert extends beyond the ground line may be either greater or less.

Frog insert 20 functions to support the coffin bone when the hoof is under load. Placement of the tip 22 must be generally located under the center of the coffin bone. As the hoof is loaded the front (anterior) end of the insert is pressed by the ground up toward the bottom of the hoof. The insert thus forces the pad to flex upwardly to apply upward primary support for the center of the coffin bone. The partial cutout areas at the sides of insert 20 enable the pad to flex more easily. Besides supporting the coffin bone, the insert also provides support for the rest of the subsolar surface. It has also been found that the invention provides stimulation of the vascular system and hence is an aid to blood circulation.

It will be appreciated that pad 12 may be wedged as described or it may be of one thickness but still provided with insert 20. Such flat pads may be used in less severe cases or in later treatment as healing of the hoof progresses.

The heels are raised and tapered forwardly to elevate the heels to relax tendon pull on the coffin bone. The raised ground contact surfaces of the heel members are formed on the inner, rearward edges of the branches so that it is inside the line of the nail holes. Locating the ground contact surface as shown and described reduces stress on medial and lateral movement of the hoof. The nail holes are located more nearly to the posterior portion of the foot away from the traumatized area to give additional freedom to the coffin bone.

The beveled toe section 45 of the closed toe shoe of FIGS. 1-5 is designed to span the area directly across the tip of the coffin bone and not extend beyond the lamina tissue at the toe of the hoof. The toe area is widened and made concave on the hoof side as at 45 to provide protection and relief so that the coffin bone does not make contact with either shoe or pad.

Frog insert 20 is located so that it extends approximately ¼ to ¾ inch beyond a line from the last contact point of the heel and the first contact point of the toe. Stated another way, the insert is located so that tip 22 is positioned within ¼ to ¾ inch posteriorly of the anterior of the frog's origin.

Preparing the horse's foot for installation of the hoof pad and shoe combination is important on a horse that has laminitis founder. The hoof wall is trimmed low at the heels to the level and plane of the frog. This process is called "derotating the foot." Special attention is given to not trimming close to the sole ahead of the tip of the frog. Hoof testers are then used to determine the extreme painful areas of the foot, especially specific areas of the frog. When the most painful spot on the frog is determined, the area behind, or to the rear of, this spot is marked. A line is drawn from one side of the foot to the other side, through that spot. The shoe is then fitted to the foot, placing the inner border of the toe from ¾-1 inch forward of the apex, or tip, of the frog. A mark is made on the sole of wall of the hoof at the front edge of the shoe to enable one to attach the shoe and pad assembly in that exact position by use of the reference mark. Marks are then made on each branch of the shoe, using the line drawn across the foot, through the painful spot on the frog, so that the area behind the painful spot can be determined with reference to the shoe's placement. The pad is then attached to the shoe, using the slot 300 in the forward portion of the pad and a flatheaded screw inserted through the slot 300 and threaded into threaded hole 3 in the bottom of the shoe. By means of the length of the slot 300, the pad can be shifted relative to the shoe so that the tip 22 of the frog insert 20 is in line with the two marks made on each branch of the shoe. The pad is then attached to the underside of the shoe, using a flatheaded attachment screw, or a rivet, that extends through slot 300 into threaded hole 3. By so doing, the portion of the pad overlaying the dished-out portion 45 (in the case of the shoe of FIGS. 1-5) is pulled away from the foot. The shoe is positioned on the foot, using the locator mark made at the toe of the foot, and then attached to the foot by nails or adhesives. This permits the front of the hoof to be free of the shoe but supported centrally by the raised area 1 on the upper side of the pad. This support may be necessary when the foot is loaded under weight-bearing. It is important that the pad apply support directly to the area indicated by the pain response test on the frog. As the horse wears this pad-shoe assembly, it will load the frog first through the downwardly depending frog insert 20 on the ground side of the shoe, and secondly through the raised area 1 on the foot side of the pad. As the frog yields to downward force of the coffin bone, the bars are picked up by the pad surrounding the raised center section 1. The more active the horse becomes, the more the sole participates in supporting the coffin bone.

For use with the open-toed embodiment of FIGS. 11-13, the pad may contain an flat insert 310 in its toe portion (see FIG. 16). This insert is made of a material that is stronger than the pad body material so that it will support the area around the pad body at the toe. It can be made of steel or other similar material. The slot 300 through the insert 310 permits attaching the pad to the threaded hole 3 of a closed-toe shoe, as above-described, so that the FIG. 16 pad could be used with both shoe embodiments.

The relieved area 28 on either side of the raised center 1 and frog insert 20 allows the raised center to respond as a single unit rearwardly. As the placement of frog insert 20 on the ground applies an upward force to the pad, the relieved areas 28 enable the entire longitudinal center portion 1 of the pad to move upward as a single unit to bear relatively uniformly against the underside of the frog.

Heel members can be added when required. The type of heel elevation to be used is determined by the terrain that the horse will traverse and the requirement for relieving pull on the flexor tendon. This will vary from case to case.

The open-toed shoe of FIGS. 11-13 functions basically as described above except that the shoe on the closed, heel end extends under the rear end portion of the pad as seen in FIG. 12. This function is necessary in some cases when more consistent support of the rear of the frog is necessary for treating contracted heels. This configuration would also encourage the tip 22 of the frog support 20 to downwardly retract away from the sole after the bearing weight of the horse is removed from the foot. For open-toed shoes of the FIGS. 11-13 type, the front of the pad would be attached by two flatheaded screws or rivets extended through the pad and threaded into the holes 4 provided at the ends of the toe portions of the shoe (see FIGS. 11 and 13). When using the open-toed shoe, the frog insert 20 provides a solid membrane between the outer branches of the shoe for protection of the sole area below the tip of the coffin bone.

When used with the open-toed shoe of FIGS. 11-13, the frog insert 20 is preferably provided with a reduced-thickness rear end portion 20a as shown in FIGS. 14 and 15. This portion 20a is preferably concave on its bottom side as shown. When applied to the shoe, this reduced portion 20a with its rounded bottom side will be supported by the closed end of the shoe extended underneath as shown in FIG. 12. The reduced portion 20a is generally completely confined between the elevated heel members 237 and does not play any function in the upward levering action of the front part of the frog insert 20. Its purpose is restricted to providing additional frog support at the rear of the frog. This bottom line of the recessed portion is preferably parallel with the top surface 15 of the pad, as shown in FIG. 15.

Figure 26:
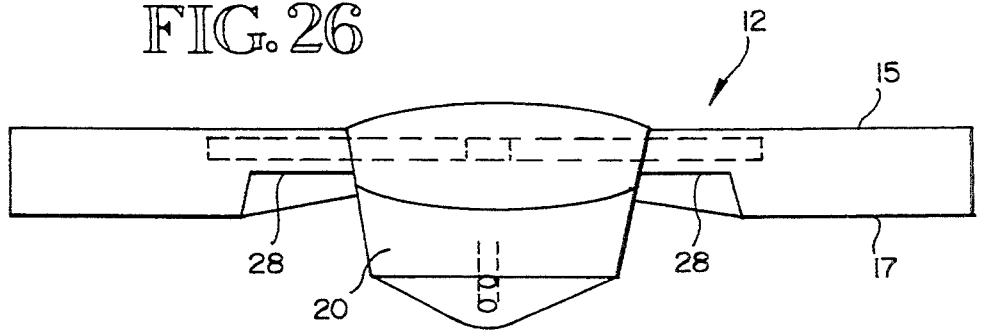
FIG. 26 is a rear end view of the FIG. 22 pad.
Figure 27:
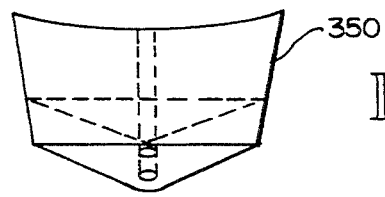
FIGS. 27–29 are, respectively, end views of the FIGS. 23–25 frog insert additions.
Figure 28:
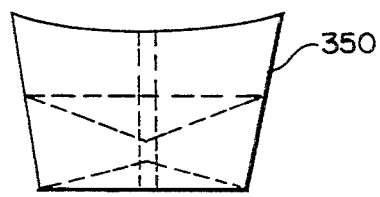
Figure 29:
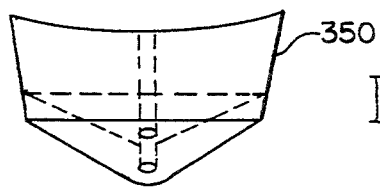

During the process of treating a horse suffering from founder laminitis, it will frequently be the case that shoes will be installed with the highest elevation to the heel members at first and that the heel members will be replaced periodically with heel members having smaller and smaller elevations. In some cases, the degree of extension of the pad's frog insert 20 below the ground line GL should be adjusted, and it is desirable to provide for such an adjustment without having to remove the shoe. This can be accomplished with frog insert shims of the type shown in FIGS. 22-29. These particular shims 350 are specifically designed to be attached to the frog insert 20 of the type shown in FIGS. 14-15. This frog insert is repeated in FIGS. 22 and 26 with the shims 350 positioned vertically below the insert to make it simpler to visualize the effect their addition would have to the pad and shoe combination. For instance, the addition of the shim 350 of FIGS. 23 and 27 would result in both lowering and leveling the bottom surface of the overlaying frog insert 20; whereas the addition of the shim 350 of FIGS. 24 and 28 would result in both lowering and reversing the slope of the bottom surface of the overlaying frog insert 20; and whereas the addition of the shim 350 of FIGS. 25 and 29 would result in both lowering and increasing the slope of the overlaying frog insert 20. These shims 350 would have the same wedge-shaped configuration, viewed in plan, of the frog insert to which they are intended to be attached. They may be attached to the overlaying frog insert 20 by means of screws 360 extended through holed 362 provided therefor in the shims and screwed into the bottom surface of the frog insert. In cases where the heels must be kept elevated to reduce strain on the flexor tendon, the degree of frog compression can be adjusted by adding or subtracting shims to the underside of the frog insert to effect various desired affects, all without having to remove the shoe to change the pad. Similar shims can be provided with the pad shown in FIGS. 6-9, excepting no provision need be made for a reduced rearward frog insert portion.

Figure 9:
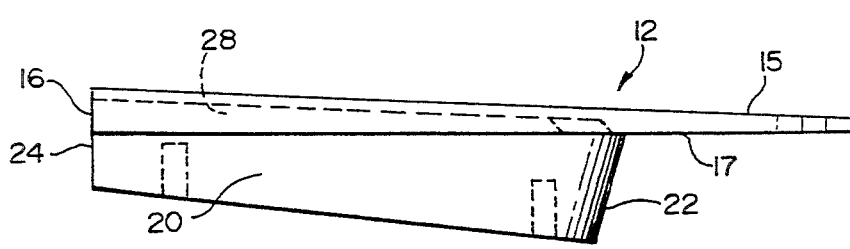
FIG. 9 is a side elevation of the FIG. 6 pad modified to provide a planar upper face.

In some cases, as shown in FIG. 9, the frog insert 20 may be provided with no raised center portion extending above the upper surface 15 of the pad.

FIG. 10 shows the relative relationship between a horse's foot, specifically the coffin bone, P3, and the frog, FROG, with respect to the closed-toe shoe and the frog insert 20. FIG. 17 does the same with respect to the open-toed shoe. In both instances, the tip 22 of the frog insert 20 is located generally underneath the center of the coffin bone. This is usually the point which would be at about or just rearward of the sorest point on the frog as determined by hoof sensitive testing.

FIG. 18 shows the relationship between the various structures on the sole of the foot relative to the pad structures. For example, the bars 400 of the sole of the foot (seen in dotted line) extend generally parallel along the frog 402 and terminate adjacent the sides of the tip 404 of the frog. The pad cutout sections 28, 28 are flared outward to underlay the mid-region of the bars 400 as shown. The cutout regions 28, 28, however, stop short of the ends of the bars 400. Consequently, while the cutout regions 28, 28 give the pad flexibility toward the rear end of the frog insert 20, the pad is less flexible toward the front end of the frog insert 20. Therefore, the ends of the bars 400 will bear against the pad upper surface and be supported thereby as the tip end 22 of the frog insert causes the pad to crown upwardly. These bars 400 play a significant role in the support of the internal structure of the foot and their adequate support by means of the pad arrangement shown in FIG. 18 is of substantial benefit in treating founder laminitis.

While the preferred embodiment of the invention has been described herein, variations in the design may be made. The scope of the invention, therefore, is only to be limited by the claims appended hereto.

The embodiments of the invention in which an exclusive property is claimed are defined as follows:

1. A combination pad and horseshoe for treatment of lameness, comprising:
   a) a pad member made of resilient material and having an upper hoof contact surface and a bottom shoe mounting surface;
   b) an elongated frog insert means carried by said pad member and extending downwardly from said shoe mounting surface and shaped such that it has a rear edge and extends forwardly from its rear edge toward an opposite end of said pad member and terminates at an inner tip end a predetermined distance from said rear edge at about the center of said pad member, said frog insert means being formed so that its rear edge will be spaced inwardly of the heel sections of a horseshoe means mounted on the pad member and so that it extends longitudinally of said pad member whereby it will generally underlie the frog portion of a hoof to which the combination is applied; and
   c) horseshoe means comprising a body member having a toe section and rearwardly extending branch members with heel sections at the ends thereof, said body member having a planar upper surface for being mounted on said pad member and a lower surface; and further comprising replaceable heel means carried by each of the heel sections of said horseshoe body member each having a raised ground contact means which extends downwardly to provide a ground contact surface sufficient to support a horse's foot with the heel thereof in a elevated position, said heel means and said frog insert means being so cooperatively constructed and arranged that the frog insert means rear edge is above the heel means ground contact surface and that the frog insert means inner tip end extends forwardly of said heel means and downwardly beyond a ground surface line when said heel means and said horseshoe body member are in full contact with the ground whereby when a horse's full weight is on a hoof shod with the combination the inner tip end of said frog insert means is pressed upwardly by the ground to urge said pad member against the frog and bars of the hoof to lend support to the coffin bone of the hoof and whereby the heel of the hoof is supported by said heel means in an elevated position.

2. The combination horseshoe and pad according to claim 1 wherein said horseshoe body member has a closed toe section and an open heel section.

3. The combination horseshoe and pad according to claim 2 and in which said toe area of said body is beveled on the lower surface thereof.

4. The combination horseshoe and pad according to claims 2 and wherein the raised ground contact means of said heel means angle forwardly and upwardly toward said lower surface of said body member.

5. The combination horseshoe and pad according to claim 2 and wherein partial cut out areas are formed on said pad on each side of said frog insert means to provide areas of said pad with reduced thickness adjacent to the side of said frog insert means to assist in the flexibility of said pad under hoof load.

6. The combination horseshoe and pad according to claim 2 and wherein said inner tip end of said frog insert member is positioned to be located within $\frac{1}{4}$ to $\frac{3}{4}$ inches posteriorly of the anterior tip of the frog's origin.

7. The combination horseshoe and pad according to claim 2 and wherein said pad is wedge shaped so as to be thicker at its rear end and thinner at its front end.

8. The combination horseshoe and pad according to claim 2 and in which said frog insert means is wedge shaped so that it is thinner at its rear end and thicker at its inner tip end such that the tip end extends beyond the ground line between the ground contact surface of the raised ground contact means of said heel means and the toe of said shoe.

9. The combination horseshoe and pad according to claim 2 wherein said frog insert means comprises an insert body integral with said pad member and includes shim means mounted to the underside of said insert body whereby the ground contacting surface of said frog insert means can be changed.

10. The combination horseshoe and pad according to claim 1 wherein said horseshoe body member has an open toe section and a closed heel section.

11. The combination horseshoe and pad according to claim 10 and in which said toe area of said body is beveled on the lower surface thereof.

12. The combination horseshoe and pad according to claims 10 and wherein the raised ground contact means of said heel means angle forwardly and upwardly toward said lower surface of said body member.

13. The combination horseshoe and pad according to claim 10 and wherein partial cut out areas are formed on said pad on each side of said frog insert means to provide areas of said pad with reduced thickness adjacent to the side of said frog insert means to assist in the flexibility of said pad under hoof load.

14. The combination horseshoe and pad according to claim 10 and wherein said inner tip end of said frog insert member is positioned to be located within $\frac{1}{4}$ to $\frac{3}{4}$ inches posteriorly of the anterior tip of the frog's origin.

15. The combination horseshoe and pad according to claim 10 and wherein said pad is wedge shaped so as to be thicker at its rear end and thinner at its front end.

16. The combination horseshoe and pad according to claim 10 and in which said frog insert means is wedge shaped so that it is thinner at its rear end and thicker at its inner tip end such that the tip end extends beyond the ground line between the ground contact surface of the raised ground contact means of said heel means and the toe of said shoe, the rear end of said frog insert means being configured to extend across the upper surface of the closed heel section; and wherein a stiffening insert is incorporated into the pad member adjacent the open toe section of the shoe body member.

17. The combination horseshoe and pad according to claim 10 wherein said frog insert means comprises an insert body integral with said pad member and includes shim means mounted to the underside of said insert body whereby the ground contacting surface of said frog insert means can be changed.

18. The combination horseshoe and pad according to claim 1 and wherein partial cut out areas are formed on said pad on each side of said frog insert means to provide areas of said pad with reduced thickness adjacent to the side of said frog insert means to assist in the flexibility of said pad under hoof load.

19. The combination horseshoe and pad according to claim 1 and wherein said inner tip end of said frog insert member is positioned to be located within $\frac{1}{4}$ to $\frac{3}{4}$ inches posteriorly of the anterior tip of the frog's origin.

20. The combination horseshoe and pad according to claim 1 and wherein said pad is wedge shaped so as to be thicker at its rear end and thinner at its front end.

21. The combination horseshoe and pad according to claim 1 and in which said frog insert means is wedge shaped so that it is thinner at its rear end and thicker at its inner tip end such that the tip end extends beyond the ground line between the ground contact surface of the raised ground contact means of said heel means and the toe of said shoe.

22. The combination horseshoe and pad according to claim 1 wherein said frog insert means comprises an insert body integral with said pad member and includes shim means mounted to the underside of said insert body whereby the ground contacting surface of said frog insert means can be changed.

23. A hoof pad for use in conjunction with a horseshoe having toe, branch and heel sections which comprises:
 a) a pad member made of resilient material and having an upper hoof contact surface and a bottom shoe mounting surface;
 b) an elongated frog insert means carried by said pad member and extending downwardly from said shoe mounting surface and shaped such that it has a rear edge and extends forwardly from its rear edge toward an opposite end of said pad member and terminates at an inner tip end a predetermined distance from said rear edge at about the center of said pad member, said frog insert means being formed so that its rear edge will be spaced inwardly of the heel sections of a horseshoe mounted on the pad member and so that it extends longitudinally of said pad member whereby it will generally underlie the frog portion of a hoof to which the pad is applied;
 c) said frog insert means comprising an insert body integral with said pad member and includes shim means mounted to the underside of said insert body whereby the ground contacting surface of said frog insert means can be changed.

24. The hoof pad according to claim 23 and wherein partial cut out areas are formed on said pad on each side of said frog insert means to provide areas of said pad with reduced thickness adjacent to the side of said frog insert means to assist in the flexibility of said pad under hoof load.

25. The hoof pad according to claim 23 and wherein said inner tip end of said frog insert member is positioned to be located within $\frac{1}{4}$ to $\frac{3}{4}$ inches posteriorly of the anterior tip of the frog's origin.

26. The hoof pad according to claim 23 and wherein said pad is wedge shaped so as to be thicker at its rear end and thinner at its front end.

27. The hoof pad according to claim 23 and in which said frog insert means is wedge shaped so that it is thinner at its rear end and thicker at its inner tip end such that the tip end will extend beyond the ground line between the ground contact surface of the heel of a horseshoe and the toe of the shoe.

28. A horseshoe comprising:
 (a) a body member having a toe section and rearwardly extending branch members with heel sections at the ends thereof, said body member having a planar upper surface for being mounted on a pad member and a lower surface, and being provided with fullering grooves containing nail holes along the body member branches; and
 (b) replaceable heel means carried by each of the heel sections of said horseshoe body member each having a raised ground contact means which extends downwardly to provide a ground contact surface sufficient to support a horse's foot with the heel thereof in a elevated position, the raised ground contact means of said heel means angling forwardly and upwardly toward said lower surface of said body member to provide a forwardly-extended ground contact surface; the raised ground contact means having a first forwardly declining ground contact surface generally parallel to the ground contact line of the horseshoe, and a second more sharply declining ground contact surface extending forwardly from said first ground contact surface to a point of intersection with the lower surface of the shoe body member at about mid-shoe; and
 (c) the raised ground contact means of each replaceable heel means having a wider rear end that is bolted to the heel sections of the shoe body member, and having a narrower forwardly extending arm provided with an arcuate configuration that extends along the inside of one of the fullering grooves, said arm having an alignment pin extending upwardly therefrom to fit into an alignment hole in the shoe body member.

29. The horseshoe of claim 28 wherein said body member has a closed toe section and an open heel section.

30. The horseshoe of claim 29 wherein the toe section is wider than the rest of the shoe and contains a concave section on the upper surface over an area sufficient to avoid contact with the sole of a horse's foot shod with the shoe beneath the tip of the horse's coffin bone, and wherein the toe section is crowned downwardly on the bottom surface.

31. The horseshoe of claim 28 wherein said body member has an open toe section and a closed heel section.

32. The horseshoe of claim 31 wherein the closed heel section extends between the raised ground contact means of said heel means.

33. A hoof pad for use in conjunction with a horseshoe having toe, branch and heel sections which comprises:
   a) a pad member made of resilient material and having an upper hoof contact surface and a bottom shoe mounting surface and a rear heel end and a front toe end;
   b) an elongated frog insert means carried by said pad member and extending downwardly from said shoe mounting surface and shaped such that it has a rear edge and extends forwardly from its rear edge toward the front toe end of said pad member and terminates at an inner tip end a predetermined distance from said rear edge at about the center of said pad member, said frog insert means being formed so that its rear edge will be spaced inwardly of the heel sections of a horseshoe mounted on the pad member and so that it extends longitudinally of said pad member whereby it will generally underlie the frog portion of a hoof to which the pad is applied, said frog insert means being further formed so that its inner tip end extends downward a sufficient distance that the inner tip end will contact the ground to apply an upward force at the inner tip end when a hoof shod with said pad member is placed in load-bearing position on the ground;
   c) said pad member being formed to provide partial cut-out areas on each side of said frog insert means to provide areas of said pad with reduced thickness adjacent to the side of said frog insert means to assist in the flexibility of said pad under hoof load, said cut-out areas extending from the rear heel edge toward the front toe edge in abutting relation to said frog insert means and terminating at a mid-portion of said frog insert means so that the inner tip end of said frog insert means extends beyond said cut-out areas so as to be supported by surrounding uncut-out areas of said pad member, whereby the inner tip end of said frog means and the surrounding uncut-out areas of said pad member will exert an upward force on front portions of the frog and on forward ends of the bars of a hoof shod with said pad member when the hoof is placed in load-bearing position on the ground, said cut-out areas permitting the heel end of said pad member to flex adjacent to the rear end of said frog insert means to enable said frog insert means to pivot so that upward pressure is relieved on the rearward portion of the frog of the hoof when the hoof is placed in load-bearing position.

34. The hoof pad according to claim 33 and wherein said inner tip end of said frog insert member is positioned to be located within ¼ to ¾ inches posteriorly of the anterior tip of the frog's origin.

35. The hoof pad according to claim 33 and wherein said pad is wedge shaped so as to be thicker at its rear end and thinner at its front end.

36. The hoof pad according to claim 33 and in which said frog insert means is wedge shaped so that it is thinner at its rear end and thicker at its inner tip end such that the tip end will extend beyond the ground line between the ground contact surface of the heel of a horseshoe and the toe of the shoe.

37. A horseshoe comprising:
   (a) a body member having a toe section and rearwardly extending branch members with heel sections at the ends thereof, said body member having a planar upper surface for being mounted on a pad member and a lower surface, and being provided with fullering grooves containing nail holes along the body member branches; and
   (b) replaceable heel means carried by each of the heel sections of said horseshoe body member each having a raised ground contact means which extends downwardly to provide a ground contact surface sufficient to support a horse's foot with the heel thereof in a elevated position, the raised ground contact means of said heel means angling forwardly and upwardly toward said lower surface of said body member to provide a forwardly-extended ground contact surface; the raised ground contact means having a first forwardly declining ground contact surface generally parallel to the ground contact line of the horseshoe, and a second more sharply declining ground contact surface extending forwardly from said first ground contact surface to a point of intersection with the lower surface of the shoe body member at about mid-shoe, said first ground contact surface being substantially flat and sufficiently elongated to support the heel of a hoof in an elevated position so as to relieve tension in the flexor tendon of a horse shod with said horseshoe.

38. The horseshoe of claim 37 wherein said body member has a closed toe section and an open heel section.

39. The horseshoe of claim 38 wherein the toe section is wider than the rest of the shoe and contains a concave section on the upper surface over an area sufficient to avoid contact the sole of a horse's foot shod with the shoe beneath the tip of the horse's coffin bone, and wherein the toe section is crowned downwardly on the bottom surface.

40. The horseshoe of claim 37 wherein said body member has an open toe section and a closed heel section.

41. The horseshoe of claim 40 wherein the closed heel section extends between the raised ground contact means of said heel means.

* * * * *